United States Patent
Deguchi et al.

(10) Patent No.: US 7,468,225 B2
(45) Date of Patent: Dec. 23, 2008

(54) NON-AQUEOUS ELECTROLYTE SECONDARY BATTERY

(75) Inventors: Masaki Deguchi, Osaka (JP); Tooru Matsui, Osaka (JP); Hiroshi Yoshizawa, Osaka (JP); Masamichi Onuki, Ibaraki (JP); Shinichi Kinoshita, Ibaraki (JP)

(73) Assignees: Panasonic Corporation, Osaka (JP); Mitsubishi Chemical Corporation, Tokyo (JP)

( * ) Notice: Subject to any disclaimer, the term of this patent is extended or adjusted under 35 U.S.C. 154(b) by 115 days.

(21) Appl. No.: 11/547,172

(22) PCT Filed: Mar. 31, 2005

(86) PCT No.: PCT/JP2005/006372

§ 371 (c)(1),
(2), (4) Date: Oct. 2, 2006

(87) PCT Pub. No.: WO2005/099023

PCT Pub. Date: Oct. 20, 2005

(65) Prior Publication Data

US 2007/0218370 A1 Sep. 20, 2007

(30) Foreign Application Priority Data

Apr. 7, 2004 (JP) ............... 2004-113203

(51) Int. Cl.
*H01M 6/18* (2006.01)
(52) U.S. Cl. ............... 429/306; 429/188; 429/231.95; 429/223; 429/224; 429/231.1
(58) Field of Classification Search ............. 429/306, 429/188, 231.95, 231.3, 223, 224
See application file for complete search history.

(56) References Cited

U.S. PATENT DOCUMENTS 6,210,840 B1 4/2001 Usami et al.
6,566,015 B1 5/2003 Yamada et al.

FOREIGN PATENT DOCUMENTS

| JP | 10-228928 A | 8/1998 |
| JP | 11-233141 A | 8/1999 |
| JP | 11-307081 A | 11/1999 |
| JP | 2001-23691 A | 1/2001 |
| JP | 2001-85056 A | 3/2001 |
| JP | 2002-198090 A | 7/2002 |
| JP | 2002-352804 A | 12/2002 |
| JP | 2004-363077 A | 12/2004 |
| KR | 2001-0028939 | 4/2001 |

*Primary Examiner*—Jane Rhee
(74) *Attorney, Agent, or Firm*—McDermott Will & Emery LLP

(57) ABSTRACT

A non-aqueous electrolyte secondary battery including a positive electrode and a negative electrode each capable of absorbing and desorbing lithium, a separator interposed therebetween, and a non-aqueous electrolyte, wherein the positive electrode includes a positive electrode active material represented by: $LiM_{1-x}L_xO_2$ where $0.005 \leq x \leq 0.1$ is satisfied, M is at least one selected from the group consisting of Mn, Co and Ni, and L is at least one selected from the group consisting of Mg, Al, Ti, Sr, Zn, B, Ca, Cr, Si, Ga, Sn, P, V, Sb, Nb, Ta, Mo, W, Zr, Y and Fe, and the non-aqueous electrolyte includes a phosphinate compound represented by:

[Chemical formula 1]

$$R^1O-\overset{\overset{\displaystyle O}{\|}}{\underset{\underset{\displaystyle R^2}{|}}{P}}-R^3$$

where $R^1$, $R^2$ and $R^3$ are each independently an aryl group, or an alkyl group, an alkenyl group or an alkynyl group each having 1 to 5 carbon atoms.

5 Claims, 1 Drawing Sheet

NON-AQUEOUS ELECTROLYTE SECONDARY BATTERY

RELATED APPLICATIONS

This application is the U.S. National Phase under 35 U.S.C. § 371 of International Application No. PCT/JP2005/006372, filed on Mar. 31, 2005, which in turn claims the benefit of Japanese Application No. 2004-113203, filed on Apr. 7, 2004, the disclosures of which Applications are incorporated by reference herein.

1. Technical Field

The present invention relates to a non-aqueous electrolyte secondary battery, and particularly to an improvement for the non-aqueous electrolyte included therein.

2. Background Art

In the field of non-aqueous electrolyte secondary batteries, vigorous studies are now being carried out on a lithium ion secondary battery having a high energy density and a high voltage. A lithium-containing transition metal oxide such as $LiCoO_2$ is commonly used as the positive electrode active material of the lithium ion secondary battery, and a carbon material is commonly used as the negative electrode active material. As the non-aqueous electrolyte, a non-aqueous solvent dissolving a solute is commonly used. For example, a cyclic carbonic acid ester, a non-cyclic carbonic acid ester or a cyclic carboxylic acid ester is used as the non-aqueous solvent. For example, lithium hexafluorophosphate ($LiPF_6$) or lithium tetrafluoroborate ($LiBF_4$) is used as the solute. Further, for the purpose of improving the battery characteristics, attempts of adding various phosphorus compounds to the positive electrode, the negative electrode or the non-aqueous electrolyte have been made.

For example, it has been proposed to contain a phosphoric acid ester (phosphate) or a thiophosphoric acid ester (thiophosphate) in the positive electrode for improving charge/discharge cycle characteristics (see Patent Documents 1 and 2). According to this proposal, phosphoric acid esters and thiophosphoric acid esters adsorb to the surface of the positive electrode active material, thus covering the surface. Then, they inhibit the side reaction between the non-aqueous electrolyte and the positive electrode active material. It is stated that, for this reason, the charge/discharge cycle characteristics can be expected to improve.

In addition, it has peen proposed to contain a phosphorus compound such as phosphate, phosphonate or phosphinate in the non-aqueous electrolyte, for the purpose of imparting flame resistance to the non-aqueous electrolyte (see Patent Document 3). The above-mentioned phosphorous compounds have an ether bond. For example, phosphinate having an ether bond, such as methoxyethyl phosphinate and methoxyethyl dimethyl phospinate, which include a methoxyethyl group, are used. In this proposal, it is stated that a phosphorus compound having an ether bond imparts high flame resistance to the non-aqueous electrolyte, without adversely affecting the battery performance.

Patent Document 1: Japanese Laid-Open Patent Publication No. Hei 11-307081

Patent Document 2: Japanese Laid-Open Patent Publication No. 2002-352804

Patent Document 3: Japanese Laid-Open Patent Publication No. Hei 10-228928

DISCLOSURE OF THE INVENTION

Problem that the Invention is to Solve

Conventionally proposed phosphorus compounds do not sufficiently adsorb to the surface of the positive electrode active material at a high temperature. When the surface of the positive electrode active material is not sufficiently covered with the phosphorus compound, the side reaction between the non-aqueous electrolyte and the positive electrode active material becomes violent. Accordingly, the cycle characteristics at a high temperature become very low. Additionally, the phosphorus compounds having an ether bond have low resistance to oxidation, and therefore may decompose to produce gas inside the battery.

For solving such problems, the present invention provides a non-aqueous electrolyte secondary battery exhibiting good charge/discharge cycle characteristics particularly at a high temperature.

Means for Solving the Problem

The present invention relates to a non-aqueous electrolyte secondary battery including a positive electrode capable of absorbing and desorbing lithium, a negative electrode capable of absorbing and desorbing lithium, a separator interposed between the positive electrode and the negative electrode, and a non-aqueous electrolyte.

Here, the positive electrode includes a positive electrode active material represented by the general formula (1): $LiM_{1-x}L_xO_2$ where x satisfies $0.005 \leq x \leq 0.1$, the element M is at least one selected from the group consisting of Mn, Co and Ni, the element L is at least one selected from the group consisting of metallic elements and semi-metallic elements, and the element M and the element L are different elements.

Furthermore, the non-aqueous electrolyte includes a phosphinate compound represented by the general formula (2):

[Chemical formula 1]

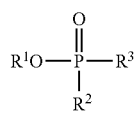

where $R^1$, $R^2$ and $R^3$ are each independently an aryl group, an alkyl group having 1 to 5 carbon atoms, an alkenyl group having 1 to 5 carbon atoms or an alkynyl group having 1 to 5 carbon atoms.

It is preferable that the element L is dissolved in the crystal of the positive electrode active material, and the positive electrode active material forms a solid solution. When the positive electrode active material includes the element L, a metal oxide or a semi-metal oxide is formed on the surface of the positive electrode active material. For example, MgO is produced when the element L is Mg, and $Al_2O_3$ is produced when the element L is Al.

The metal oxide or the semi-metal oxide strongly interacts with the phosphinate compound represented by the formula (2). Accordingly, the phosphinate compound is drawn to the surface of the positive electrode active material and then adsorbs to the surface, thus forming a strong film. Specifically, it seems that a Lewis acid site comprising metallic cations in the metal oxide or the semi-metal oxide and the oxygen atoms of the phosphinate compound are drawn to each other.

Since the metal oxide and the phosphinate compound represented by the formula (2) strongly interact with each other, the film comprising the phosphinate compound can be formed even at a high temperature. Therefore, the side reaction between the non-aqueous electrolyte and the positive electrode active material can be suppressed even at a high temperature. Accordingly, the cycle characteristics of the non-aqueous electrolyte secondary battery at a high temperature improve.

The element L is preferably at least one selected from the group consisting of Mg, Al, Ti, Sr, Zn, B, Ca, Cr, Si, Ga, Sn, P, V, Sb, Nb, Ta, Mo, W, Zr, Y and Fe, and more preferably at least one selected from the group consisting of Mg, Al, Ti and Sr. Metal oxides produced from Mg, Al, Ti and Sr have a particularly strong interaction with the phosphinate compound, thus forming a strong film.

It is preferable that the phosphinate compound represented by the formula (2) includes ethyl diethyl phosphinate (EDEPP). This is because ethyl diethyl phosphinate has a particularly strong interaction with the metal oxide produced on the surface of the positive electrode active material, thus forming a strong film.

The phosphinate compound represented by the formula (2) does not include an ether bond. In that respect, it is different from conventionally proposed phosphinate compounds such as methoxyethyl phosphinate and methoxyethyl dimethyl phosphinate. Phosphinate compounds having an ether bond can easily be decomposed. In addition, it seems that the ether bond inhibits the interaction between the metal oxide produced on the surface of the positive electrode active material and the phosphinate compound.

It is preferable that the non-aqueous electrolyte further includes at least one selected from the group consisting of vinylene carbonate (VC) and vinyl ethylene carbonate (VEC). Since vinylene carbonate and vinyl ethylene carbonate have a carbon-carbon unsaturated bond, they form a thin polymer-like film on the surface of the positive electrode active material at the time of charge. A composite film comprising this film and a film derived from the phosphinate compound has particularly high heat resistance. Formation of such a composite film further increases the effect of suppressing the side reaction between the non-aqueous electrolyte and the positive electrode active material at a high temperature.

Effect of the Invention

With the present invention, it is possible to provide a non-aqueous electrolyte secondary battery that exhibits good charge/discharge cycle characteristics even at a high temperature.

BEST MODE FOR CARRYING OUT THE INVENTION

Figure 1:
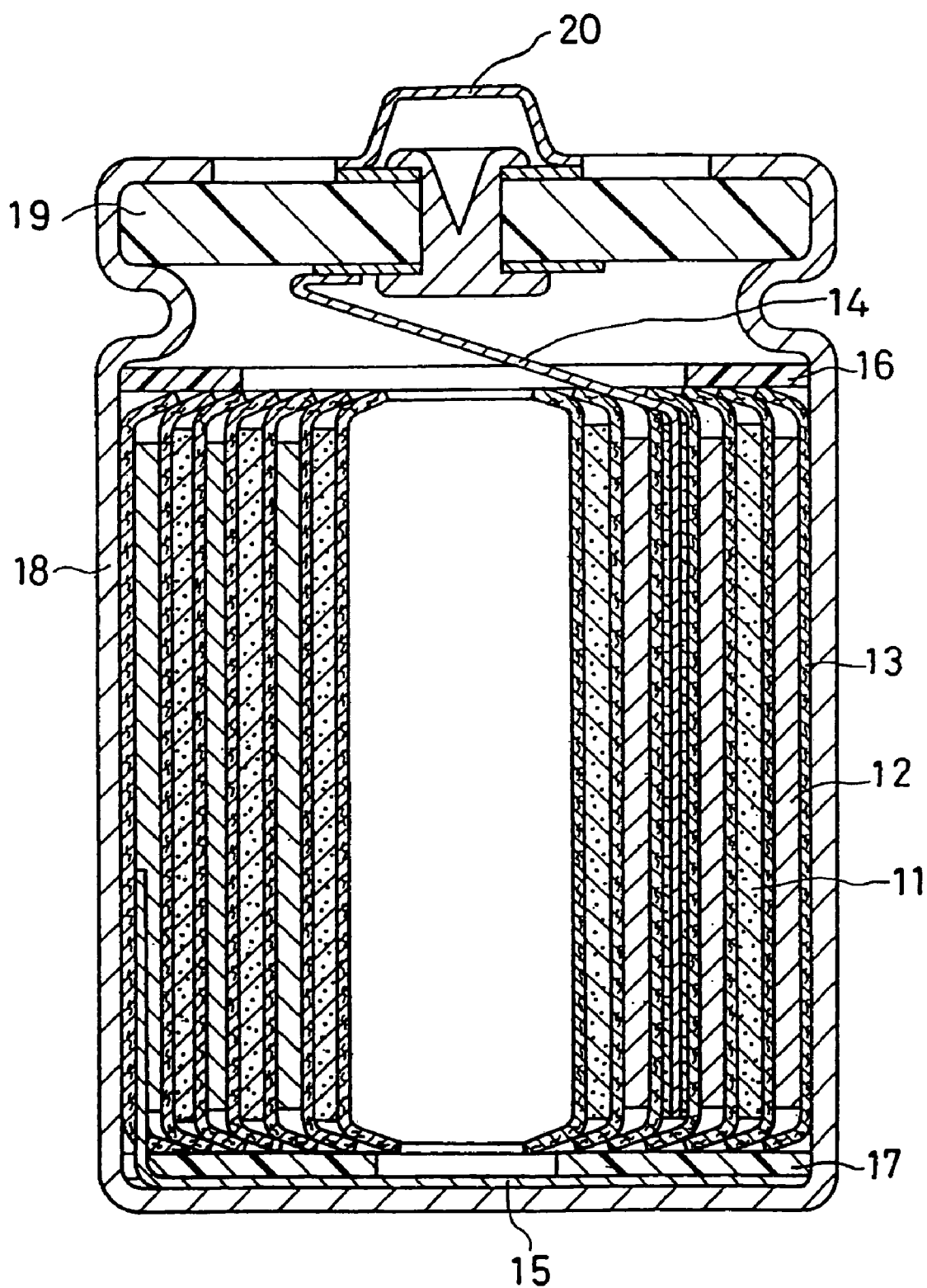
FIG. 1 is a vertical cross-sectional view of a cylindrical non-aqueous electrolyte secondary battery according to an example of the present invention.

A non-aqueous electrolyte secondary battery according to the present invention includes a positive electrode capable of absorbing and desorbing lithium, a negative electrode capable of absorbing and desorbing lithium, a separator interposed between the positive electrode and the negative electrode, and a non-aqueous electrolyte. There is no particular limitation with respect to the shape and the like of the battery.

The present invention may be applied to batteries with all shapes such as a cylindrical shape and a square shape. Furthermore, the present invention may also be applied to batteries that include a laminated electrode plate group in which the positive electrodes and the negative electrodes are laminated with the separators interposed therebetween, or may be applied to batteries that include a cylindrical electrode plate group in which the positive electrode and the negative electrode are wound with the separator interposed therebetween.

The positive electrode capable of absorbing and desorbing lithium includes a positive electrode active material represented by the general formula (1): $LiM_{1-x}L_xO_2$. In the formula (1), the element M is the main metal element constituting the crystal of the positive electrode active material. On the other hand, the element L causes a metal oxide to be produced on the surface of the positive electrode active material.

In the formula (1), x needs to satisfy $0.005 \leq x \leq 0.1$. When x is less than 0.005, a sufficient amount of the metal oxide is not produced on the surface of the positive electrode active material. When x exceeds 0.1, on the other hand, the capacity of the positive electrode active material becomes excessively small.

The element M is at least one selected from the group consisting of Mn, Co and Ni. Accordingly, as the positive electrode active material, it is possible to use, for example, a material such as a lithium cobalt oxide (e.g., $LiCoO_2$), a lithium nickel oxide (e.g., $LiNiO_2$) and a lithium manganese oxide (e.g., $LiMnO_2$) in which the transition metal is partly replaced by the element L or the other element M. One of these positive electrode active materials may be used singly, or two or more of them may be used in combination. A compound represented by the general formula (1) and a compound other than that compound (e.g., $LiCoO_2$, $LiNiO_2$, $LiMnO_2$ or $LiMn_2O_4$) may be used in combination. However, it is preferable that the compound other than the compound represented by the general formula (1) is not more than 70 wt % of the entire positive electrode active material, from the viewpoint of sufficiently ensuring the effect of the present invention.

The element L is at least one selected from the group consisting of metallic elements and semi-metallic elements, and the element M and the element L are different elements. Preferably, the element L is at least one selected from the group consisting of Mg, Al, Ti, Sr, Zn, B, Ca, Cr, Si, Ga, Sn, P, V, Sb, Nb, Ta, Mo, W, Zr, Y and Fe, and it is particularly preferable to use one of, or two or more of Mg, Al, Ti and Sr.

Among the positive electrode active materials represented by the general formula (1), compounds that are represented, for example, by $LiCo_{1-x}L_xO_2$, $LiNi_{1-x}L_xO_2$, $LiMn_{1-x}L_xO_2$, $Li(Ni_{1-y}Co_y)_{1-x}L_xO_2$ and $Li(Ni_{1-y-z}Co_yMn_z)_{1-x}L_xO_2$ (where $0.005 \leq x \leq 0.1$, $0.1 \leq y \leq 0.7$, $0.1 \leq z \leq 0.7$) are particularly preferable, since they can easily provide the effect of the present invention.

In addition to the above-described positive electrode active material, the positive electrode may include a conductive agent and a binder comprising a resin and the like. For example, the positive electrode can be obtained by carrying a positive electrode material mixture including the positive electrode active material, a binder and a conductive agent on a positive electrode current collector comprising a metal foil.

It is preferable that the negative electrode capable of absorbing and desorbing lithium includes a carbon material as the negative electrode active material. Various artificial graphites, natural graphites and the like can be preferably used as the carbon material. Furthermore, materials known as negative electrode active materials for non-aqueous electrolyte secondary batteries can be used without any particular limitations. For example, it is also possible to use various composite oxides, a metal as a simple substance or an alloy that forms an alloy with lithium, and an alkali metal such as lithium or sodium.

The non-aqueous electrolyte comprises a non-aqueous solvent and a solute dissolved in the solvent, and includes a phosphinate compound represented by the general formula (2):

[Chemical formula 2]

where $R^1$, $R^2$ and $R^3$ are each independently an aryl group, an alkyl group having 1 to 5 carbon atoms, an alkenyl group having 1 to 5 carbon atoms or an alkynyl group having 1 to 5 carbon atoms.

In the formula (2), it seems preferable that $R^1$ has a particularly strong electron-releasing property, and is preferably an alkyl group or the like having 1 to 5 carbon atoms. For example, it is preferably an ethyl group, a methyl group, a propyl group, a butyl group, a vinyl group, an allyl group or a phenyl group. Similarly, $R^2$ and $R^3$ are also preferably an ethyl group, a methyl group, a propyl group, a butyl group, a vinyl group, an allyl group, a phenyl group or the like. It is preferable that $R^2$ and $R^3$ are the same group.

Examples of the preferred phosphinate compound include ethyl diethyl phosphinate, methyl dimethyl phosphinate, vinyl diethyl phosphinate, ethyl dibutyl phosphinate, phenyl diethyl phosphinate, allyl diphenyl phosphinate, ethyl dimethyl phosphinate, methyl diethyl phosphinate, ethyl divinyl phosphinate, ethyl diallyl phosphinate, ethyl diphenyl phosphinate, methyl divinyl phosphinate, methyl diallyl phosphinate and methyl diphenyl phosphinate.

Among the above-mentioned phosphinate compounds, ethyl diethyl phosphinate is particularly preferable, in terms of the inductive effect of the molecule and the steric effect. When $R^1$ is an electron-releasing group, the adjacent oxygen atom becomes more anionic, and therefore facilitates the adsorption to the metal oxide. Since the inductive effect, although not very large, is expected to be provided by R2 and $R^3$, they are also preferably an electron-releasing group.

The order of the strength of the electron-releasing property is as follows: pentyl group>butyl group>propyl group>ethyl group>methyl group. However, when $R^1$ to $R^3$ are excessively large groups, the steric effect thereof may prevent the phosphinate compound from adsorbing to the metal oxide. It seems that the balance between the inductive effect of the molecule and the steric effect is most favorable in ethyl diethyl phosphinate.

As the non-aqueous solvent of the non-aqueous electrolyte, it is possible to use, for example, a cyclic carbonic acid ester, a non-cyclic carbonic acid ester and a cyclic carboxylic acid ester. Preferably, two or more of these may be used in combination.

As the cyclic carbonic acid ester, it is possible to use, for example, ethylene carbonate, propylene carbonate, butylene carbonate, fluoroethylene carbonate and trifluoropropylene carbonate. Among these, it is preferable to use at least ethylene carbonate.

As the non-cyclic carbonic acid ester, it is possible to use, for example, dimethyl carbonate, diethyl carbonate, methyl ethyl carbonate, ethyl-2,2,2-trifluoroethyl carbonate, and di-2,2,2-trifluoroethyl carbonate.

As the cyclic carboxylic acid ester, it is possible to use, for example, γ-butyrolactone, γ-valerolactone, α-methyl-γ-butyrolactone and β-methyl-γ-butyrolactone.

It is preferable that the cyclic carbonic acid ester is not less than 5 wt % of the entire non-aqueous solvent, since it is a high-permittivity solvent and thus plays an important role in the ionization of the solute. However, when the proportion of the cyclic carbonic acid ester is large, the viscosity of the non-aqueous electrolyte increases, so that it is preferable that the cyclic carbonic acid ester is not more than 50 wt % of the entire non-aqueous solvent.

When the cyclic carbonic acid ester is used in the above-described proportion, although there is no particular limitation with respect to the kind of the non-cyclic carbonic acid ester or its proportion in the entire non-aqueous solvent, it is preferable to use diethyl carbonate in order to suppress generation of gas. There is also no particular limitation with respect to the kind of the cyclic carboxylic acid ester or its proportion in the entire non-aqueous solvent.

It is preferable that the non-aqueous electrolyte further includes at least one cyclic carbonic acid ester including a carbon-carbon double bond that is selected from vinylene carbonate and vinyl ethylene carbonate. The cyclic carbonic acid ester including a carbon-carbon double bond improves the heat resistance of the film derived from the phosphinate compound.

The amount of the cyclic carbonic acid ester including a carbon-carbon double bond is preferably 0.5 to 10 parts by weight, per 100 parts by weight of the non-aqueous solvent. When the amount of the cyclic carbonic acid ester including a carbon-carbon double bond is too large, the film derived from the cyclic carbonic acid ester including a carbon-carbon double bond is formed in excess on the surface of the positive electrode active material, thus increasing the resistance at the positive electrode and possibly impeding the charge/discharge reaction; when it is too small, the effect of improving the heat resistance of the film derived from the phosphinate compound cannot be achieved sufficiently.

As the solute dissolved in the non-aqueous solvent, it is possible to use, for example, lithium hexafluorophosphate ($LiPF_6$), lithium tetrafluoroborate ($LiBF_4$) and bis (trifluoromethanesulfonyl) imide lithium ($LiN(CF_3SO2)$ 2).

The amount of the phosphinate compound represented by the formula (2) that is included in the non-aqueous electrolyte is preferably 0.05 to 10 parts by weight, more preferably 0.05 to 5 parts by weight, per 100 parts by weight of the non-aqueous solvent. When the amount of the phosphinate compound is too large, the film derived from the phosphinate compound is formed in excess on the surface of the positive electrode active material, thus increasing the resistance at the positive electrode. On the other hand, when the amount of the phosphinate compound is too small, the film cannot be formed sufficiently, so that the effect of suppressing the side reaction between the non-aqueous electrolyte and the positive electrode active material may not be achieved sufficiently.

Next, the present invention is specifically described by way of examples, but the invention is not limited to the following examples.

EXAMPLE 1

(i) Preparation of Non-aqueous Electrolyte

Ethylene carbonate (EC) and ethyl methyl carbonate (EMC) were mixed at a volume ratio of 1:3, and this was used as a non-aqueous solvent. One part by weight of ethyl diethyl phosphinate (EDEPP) was added as the phosphinate compound, per 100 parts by weight of this non-aqueous solvent. Then, $LiPF_6$ was dissolved at a concentration of 1.0 mol/L in the non-aqueous solvent containing EDEPP, thus preparing a non-aqueous electrolyte.

(ii) Production of Positive Electrode

A positive electrode active material: $LiCo_{0.95}Mg_{0.05}O_2$, containing Co as the element M and Mg as the element L, was prepared.

85 parts by weight of powder of this positive electrode active material, 10 parts by weight of acetylene black as a conductive agent and 5 parts by weight of a polyvinylidene fluoride resin as a binder were mixed, and the mixture was dispersed in dehydrated N-methyl-2-pyrrolidone to prepare a positive electrode material mixture slurry. This positive electrode material mixture slurry was applied onto a positive electrode current collector comprising an aluminum foil, followed by drying. Thereafter, the positive electrode material mixture coating was rolled, thus obtaining a positive electrode.

(iii) Production of Negative Electrode 75 parts by weight of powder of an artificial graphite, 20 parts by weight of acetylene black as a conductive agent and 5 parts by weight of a polyvinylidene fluoride resin as a binder were mixed, and the mixture was dispersed in dehydrated N-methyl-2-pyrrolidone to prepare a negative electrode material mixture slurry. This negative electrode material mixture slurry was applied onto a negative electrode current collector comprising a copper foil, followed by drying. Thereafter, the negative electrode material mixture coating was rolled, thus obtaining a negative electrode.

(iv) Production of Cylindrical Battery

A cylindrical battery was produced by the following procedure. FIG. 1 shows a vertical cross-sectional view of the obtained battery.

The above-described positive electrode plate 11 and negative electrode plate 12 were spirally wound with a separator 13 disposed therebetween, thus producing an electrode plate group. The obtained electrode plate group was housed in a battery case 18 made of nickel-plated iron. At that time, insulating plates 16 and 17 were respectively disposed at the top and the bottom of the electrode plate group. A positive electrode lead 14 made of aluminum that was attached to the positive electrode 11 was connected to the rear surface of a sealing plate 19 that was electrically connected to a positive electrode terminal 20. A negative electrode lead 15 made of nickel that was attached to a negative electrode 12 was connected to the bottom of the battery case 18. A predetermined non-aqueous electrolyte was injected into the battery case 18, and the opening of the battery case 18 was sealed with the sealing plate 19.

(v) Evaluation of Battery

The obtained battery was subjected to repeated charge/discharge cycles at 45° C., and the capacity retention rate of the battery after 500 cycles was calculated, taking the discharge capacity at the third cycle as 100%. The result is shown in Table 1.

In the above-described charge/discharge cycles, constant current/constant voltage charging was performed for two and half hours as the charge, with the maximum current being set to 1050 mA and the upper limit voltage being set to 4.2 V. As the discharge, constant current discharging was performed, with the discharge current being set to 1500 mA, and the end-of-discharge voltage being set to 3.0 V.

TABLE 1

| | Positive electrode active material | EDEPP (part by weight) | Capacity retention rate after 500 cycles (%) |
|---|---|---|---|
| Example 1 | $LiCo_{0.95}Mg_{0.05}O_2$ | 1 | 87.4 |
| Com. Ex. 1 | $LiCo_{0.95}Mg_{0.05}O_2$ | — | 55.1 |
| Com. Ex. 2 | $LiCoO_2$ | 1 | 53.0 |
| Com. Ex. 3 | $LiCoO_2$ | — | 42.7 |

COMPARATIVE EXAMPLE 1

A non-aqueous electrolyte containing no phosphinate compound was prepared. More specifically, $LiPF_6$ was dissolved at a concentration of 1.0 mol/L in a non-aqueous solvent in which ethylene carbonate (EC) and ethyl methyl carbonate (EMC) were mixed at a volume ratio of 1:3, thus preparing a non-aqueous electrolyte.

A battery was produced in the same manner as in Example 1, except for using the above-described non-aqueous electrolyte. Then, as in Example 1, the obtained battery was subjected to charge/discharge cycles at 45° C., and the capacity retention rate of the battery after 500 cycles was calculated. The result is shown in Table 1.

COMPARATIVE EXAMPLE 2

A battery was produced in the same manner as in Example 1, except for using lithium cobaltate: $LiCoO_2$ as the positive electrode active material. Then, as in Example 1, the obtained battery was subjected to charge/discharge cycles at 45° C., and the capacity retention rate of the battery after 500 cycles was calculated. The result is shown in Table 1.

COMPARATIVE EXAMPLE 3

A non-aqueous electrolyte containing no phosphinate compound was prepared. More specifically, $LiPF_6$ was dissolved at a concentration of 1.0 mol/L in a non-aqueous solvent in which ethylene carbonate (EC) and ethyl methyl carbonate (EMC) were mixed at a volume ratio of 1:3, thus preparing a non-aqueous electrolyte.

A battery was produced in the same manner as in Example 1, except for using lithium cobaltate: $LiCoO_2$ as the positive electrode active material, and further using the above-described non-aqueous electrolyte. Then, as in Example 1, the obtained battery was subjected to charge/discharge cycles at 45° C., and the capacity retention rate of the battery after 500 cycles was calculated. The result is shown in Table 1.

It can be seen from Table 1 that when $LiCo_{0.95}Mg_{0.05}O_2$ was used as the positive electrode active material and ethyl diethyl phosphinate (EDEPP) was contained in the non-aqueous electrolyte, the cycle characteristics (capacity retention rate) were dramatically improved. The reason seems to be that the metal oxide on the positive electrode active material and the EDEPP had a strong interaction, and the EDEPP adsorbed onto the positive electrode active material formed a stable film.

EXAMPLE 2

A battery was produced in the same manner as in Example 1, except for using a positive electrode active material: $LiM_{1-x}L_xO_2$ having the compositions listed in Table 2 either singly, or in combination with another positive electrode active material. The mixing ratios (wt %) when using mixtures of plural positive electrode active materials were as listed in Table 2. Then, as in Example 1, the obtained batteries were each subjected to charge/discharge cycles at 45° C., and the capacity retention rates of the batteries after 500 cycles were calculated. The results are shown in Table 2.

TABLE 2

| Positive electrode active material | EDEPP (part by weight) | Capacity retention rate after 500 cycles (%) |
|---|---|---|
| $LiCo_{0.98}Mg_{0.02}O_2$ | 1 | 88.8 |
| $LiCo_{0.98}Al_{0.02}O_2$ | 1 | 86.9 |
| $LiCo_{0.98}Ti_{0.02}O_2$ | 1 | 85.4 |
| $LiCo_{0.98}Sr_{0.02}O_2$ | 1 | 85.1 |
| $LiCo_{0.98}Zn_{0.02}O_2$ | 1 | 81.0 |
| $LiCo_{0.98}B_{0.02}O_2$ | 1 | 81.4 |
| $LiCo_{0.98}Ca_{0.02}O_2$ | 1 | 82.5 |
| $LiCo_{0.98}Cr_{0.02}O_2$ | 1 | 80.7 |
| $LiCo_{0.98}Si_{0.02}O_2$ | 1 | 81.0 |
| $LiCo_{0.98}Ga_{0.02}O_2$ | 1 | 83.1 |
| $LiCo_{0.98}Sn_{0.02}O_2$ | 1 | 80.8 |
| $LiCo_{0.98}P_{0.02}O_2$ | 1 | 81.3 |
| $LiCo_{0.98}V_{0.02}O_2$ | 1 | 82.2 |
| $LiCo_{0.98}Sb_{0.02}O_2$ | 1 | 81.9 |
| $LiCo_{0.98}Nb_{0.02}O_2$ | 1 | 82.2 |
| $LiCo_{0.98}Ta_{0.02}O_2$ | 1 | 81.3 |
| $LiCo_{0.98}Mo_{0.02}O_2$ | 1 | 82.9 |
| $LiCo_{0.98}W_{0.02}O_2$ | 1 | 80.5 |
| $LiCo_{0.98}Zr_{0.02}O_2$ | 1 | 82.1 |
| $LiCo_{0.98}Y_{0.02}O_2$ | 1 | 82.0 |
| $LiCo_{0.98}Fe_{0.02}O_2$ | 1 | 81.8 |
| $LiNi_{0.8}Co_{0.15}Al_{0.05}O_2$ | 1 | 86.2 |
| $LiNi_{0.33}Mn_{0.33}Co_{0.33}Al_{0.01}O_2$ | 1 | 85.0 |
| $LiCo_{0.98}Mg_{0.015}Al_{0.005}O_2$ | 1 | 88.3 |
| $LiCo_{0.90}Mg_{0.1}O_2$ | 1 | 82.1 |
| $LiCo_{0.995}Mg_{0.005}O_2$ | 1 | 81.6 |
| $LiNi_{0.95}Al_{0.05}O_2$ | 1 | 84.4 |
| $LiCo_{0.98}Mg_{0.02}O_2$ (80%) + $LiNi_{0.33}Mn_{0.33}Co_{0.33}Al_{0.01}O_2$ (20%) | 1 | 87.5 |
| $LiCo_{0.98}Mg_{0.02}O_2$ (80%) + $LiCoO_2$ (20%) | 1 | 87.1 |
| $LiNi_{0.33}Mn_{0.33}Co_{0.33}Al_{0.01}O_2$ (30%) + $LiCoO_2$ (70%) | 1 | 84.8 |

It can be seen from Table 2 that a battery exhibiting good cycle characteristics at a high temperature was obtained when the positive electrode active material that was represented by the composition: $LiM_{1-x}L_xO_2$, included at least one selected from the group consisting of Mn, Co and Ni as the element M, included at least one selected from the group consisting of Mg, Al, Ti, Sr, Zn, B, Ca, Cr, Si, Ga, Sn, P, V, Sb, Nb, Ta, Mo, W, Zr, Y and Fe as the element L and satisfied $0.005 \leq x \leq 0.1$ were combined with the non-aqueous electrolyte containing ethyl diethyl phosphinate (EDEPP).

Additionally, similar favorable result was also obtained when a mixture of the positive electrode active materials represented by the above compositions, or a mixture of one of the positive electrode active materials represented by the above compositions and another positive electrode active material such as $LiCoO_2$.

Further, it can be seen from Table 2 that a battery exhibiting particularly excellent cycle characteristics at a high temperature was obtained when the element L included in the positive electrode active material was at least one selected from the group consisting of Mg, Al, Ti and Sr.

EXAMPLE 3

A non-aqueous solvent in which ethylene carbonate (EC) and ethyl methyl carbonate (EMC) were mixed at a volume ratio of 1:3 was used. One part by weight of the phosphinate compounds listed in Table 3 were each added, per 100 parts by weight of this non-aqueous solvent. Then, $LiPF_6$ was dissolved at a concentration of 1.0 mol/L in each of the non-aqueous solvents containing the phosphinate compounds, thus preparing non-aqueous electrolytes.

Batteries were produced in the same manner as in Example 1, except for using the above-described non-aqueous electrolytes. Then, as in Example 1, the obtained batteries were each subjected to charge/discharge cycles at 45° C., and the capacity retention rates of the batteries after 500 cycles were calculated. The results are shown in Table 3.

TABLE 3

| Positive electrode active material | Phosphinate compound | Capacity retention rate after 500 cycles (%) |
|---|---|---|
| $LiCo_{0.95}Mg_{0.05}O_2$ | ethyl diethyl phosphinate (EDEPP) | 87.4 |
| | methyl dimethyl phosphinate (MDMPP) | 83.3 |
| | vinyl diethyl phosphinate (VDEPP) | 84.1 |
| | ethyl dibutyl phosphinate (EDBPP) | 81.5 |
| | phenyl diethyl phosphinate (PhDEPP) | 82.9 |
| | allyl diphenyl phosphinate (ADPhPP) | 81.0 |

It can be seen from Table 3 that a battery exhibiting good cycle characteristics at a high temperature was obtained when the positive electrode active material: $LiCo_{0.95}Mg_{0.05}O_2$ was combined with the non-aqueous electrolytes containing the various phosphinate compounds.

Furthermore, in Table 3, the battery using ethyl diethyl phosphinate (EDEPP) as the phosphinate compound exhibited particularly good cycle characteristics. The reason seems to be that the metal oxide on the positive electrode active material and the EDEPP had a particularly strong interaction, thus forming a strong film.

EXAMPLE 4

Ethyl diethyl phosphinate (EDEPP) in the amounts that are listed in Table 4 was each added, per 100 parts by weight of a non-aqueous solvent in which ethylene carbonate (EC) and ethyl methyl carbonate (EMC) were mixed at a volume ratio of 1:3. Subsequently, $LiPF_6$ was dissolved at a concentration of 1.0 mol/L in each of the non-aqueous solvents containing the phosphinate compound, thus preparing non-aqueous electrolytes.

Batteries were produced in the same manner as in Example 1, except for using $LiCo_{0.98}Mg_{0.02}O_2$ as the positive electrode active material and the above-described non-aqueous electrolytes. Then, as in Example 1, the obtained batteries were each subjected to charge/discharge cycles at 45° C., and the capacity retention rates of the batteries after 500 cycles were calculated. The results are shown in Table 4.

TABLE 4

| Positive electrode active material | EDEPP (part(s) by weight) | Capacity retention rate after 500 cycles (%) |
|---|---|---|
| LiCo$_{0.98}$Mg$_{0.02}$O$_2$ | 0.01 | 58.6 |
| | 0.05 | 80.9 |
| | 0.1 | 81.2 |
| | 0.5 | 87.5 |
| | 1 | 88.8 |
| | 2 | 86.0 |
| | 5 | 82.7 |
| | 10 | 73.6 |

In Table 4, the battery in which the amount of ethyl diethyl phosphinate (EDEPP) was 0.01 part by weight per 100 parts by weight of the non-aqueous solvent had a low capacity retention rate. The reason seems to be that the film was not sufficiently formed on the surface of the positive electrode active material, so that the effect of suppressing the side reaction between the non-aqueous electrolyte and the positive electrode active material was small.

Similarly, the battery in which the amount of EDEPP was 10 parts by weight per 100 parts by weight of the non-aqueous solvent also had a low capacity retention rate. The reason seems to be that the film was formed in excess on the surface of the positive electrode active material, increasing the resistance at the positive electrode.

The foregoing suggests that a preferred amount of the phosphinate compound contained in the non-aqueous electrolyte is 0.05 to 5 parts by weight, per 100 parts by weight of the non-aqueous solvent.

EXAMPLE 5

Ethylene carbonate (EC), ethyl methyl carbonate (EMC) and diethyl carbonate (DEC) were mixed at a volume ratio of 3:5:2, and this was used as a non-aqueous solvent. Vinylene carbonate (VC) and/or vinyl ethylene carbonate (VEC) and ethyl diethyl phosphinate (EDEPP) in the amounts that are listed in Table 5 were each added, per 100 parts by weight of this non-aqueous solvent. Subsequently, LiPF$_6$ was dissolved at a concentration of 1.0 mol/L in each of the non-aqueous solvents containing VC and/or VEC and EDEPP, thus preparing non-aqueous electrolytes.

Batteries were produced in the same manner as in Example 1, except for using LiCo$_{0.98}$Mg$_{0.02}$O$_2$ as the positive electrode active material and the above-described non-aqueous electrolytes. Then, as in Example 1, the obtained batteries were each subjected to charge/discharge cycles at 45° C., and the capacity retention rates of the batteries after 500 cycles were calculated. The results are shown in Table 5.

TABLE 5

| | VC (part by weight) | VEC (part by weight) | EDEPP (part by weight) | Capacity retention rate after 500 cycles (%) |
|---|---|---|---|---|
| Example 5 | 0 | 0 | 1 | 85.0 |
| | 1 | 0 | 1 | 86.3 |
| | 0 | 1 | 1 | 86.2 |
| | 1 | 1 | 1 | 87.9 |
| Com. Ex 4 | 1 | 0 | 0 | 67.7 |
| | 0 | 1 | 0 | 62.3 |

COMPARATIVE EXAMPLE 4

Non-aqueous electrolytes containing no phosphinate compound were prepared. More specifically, ethylene carbonate (EC), ethyl methyl carbonate (EMC) and diethyl carbonate (DEC) were mixed at a volume ratio of 3:5:2, and this was used as a non-aqueous solvent. Vinylene carbonate (VC) or vinyl ethylene carbonate (VEC) in the amount that is shown in Table 5 was each added, per 100 parts by weight of this non-aqueous solvent. Subsequently, LiPF$_6$ was dissolved at a concentration of 1.0 mol/L in each of the non-aqueous solvents containing VC or VEC, thus preparing non-aqueous electrolytes.

Batteries were produced in the same manner as in Example 5, except for using the above-described non-aqueous electrolytes. Then, as in Example 1, the obtained batteries were each subjected to charge/discharge cycles at 45° C., and the capacity retention rates of the batteries after 500 cycles were calculated. The results are shown in Table 5.

In Table 5, a battery exhibiting good cycle characteristics at a high temperature was obtained either in the case where the non-aqueous electrolyte contained EDEPP, or in the case where it contained VC and/or VEC and EDEPP.

Further, a battery exhibiting particularly good cycle characteristics at a high temperature was obtained in the case where the non-aqueous electrolyte contained VC and/or VEC and EDEPP.

INDUSTRIAL APPLICABILITY

With the present invention, it is possible to obtain a non-aqueous electrolyte secondary battery exhibiting good cycle characteristics at a high temperature, and therefore, the present invention is particularly suitable for applications that require high cycle characteristics at a high temperature, including, for example, personal digital assistants, portable electronic appliances and hybrid electric vehicles.

The invention claimed is:

1. A non-aqueous electrolyte secondary battery comprising a positive electrode capable of absorbing and desorbing lithium, a negative electrode capable of absorbing and desorbing lithium, a separator interposed between said positive electrode and said negative electrode, and a non-aqueous electrolyte, wherein said positive electrode includes a positive electrode active material represented by the general formula (1): LiM$_{1-x}$L$_x$O$_2$ where x satisfies 0.005≦x≦0.1, said element M is at least one selected from the group consisting of Mn, Co and Ni, said element L is at least one selected from the group consisting of metallic elements and semi-metallic elements, and said element M and said element L are different elements, said non-aqueous electrolyte includes a phosphinate compound represented by the general formula (2):

[Chemical formula 1]

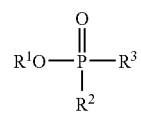

where R$^1$, R$^2$ and R$^3$ are each independently an aryl group, an alkyl group having 1 to 5 carbon atoms, an alkenyl group having 1 to 5 carbon atoms or an alkynyl group having 1 to 5 carbon atoms, and wherein the content of the phosphinate compound of general formula (2) in the non-aqueous electrolyte is 0.05 to 5 parts by weight per 100 parts by weight of the non-aqueous solvent.

2. The non-aqueous electrolyte secondary battery in accordance with claim 1,
wherein said element L is at least one selected from the group consisting of Mg, Al, Ti, Sr, Zn, B, Ca, Cr, Si, Ga, Sn, P, V, Sb, Nb, Ta, Mo, W, Zr, Y and Fe.

3. The non-aqueous electrolyte secondary battery in accordance with claim 1,
wherein said element L is at least one selected from the group consisting of Mg, Al, Ti and Sr.

4. The non-aqueous electrolyte secondary battery in accordance with claim 1,
wherein said phosphinate compound includes ethyl diethyl phosphinate.

5. The non-aqueous electrolyte secondary battery in accordance with claim 1,
wherein said non-aqueous electrolyte further includes at least one selected from the group consisting of vinylene carbonate and vinyl ethylene carbonate.

* * * * *

UNITED STATES PATENT AND TRADEMARK OFFICE
CERTIFICATE OF CORRECTION

PATENT NO. : 7,468,225 B2 Page 1 of 1
APPLICATION NO. : 11/547172
DATED : December 23, 2008
INVENTOR(S) : Masaki Deguchi et al.

It is certified that error appears in the above-identified patent and that said Letters Patent is hereby corrected as shown below:

In Column 6, Line 44, change "$LiN(CF_3SO2)2)$." to --$LiN(CF_3SO_2)_2)$.--

Signed and Sealed this

Twelfth Day of May, 2009

JOHN DOLL
*Acting Director of the United States Patent and Trademark Office*